March 26, 1968   W. J. KUDLATY   3,374,890
HYDRAULICALLY BALANCED BY-PASS INDICATOR FOR FILTERS
Filed Feb. 19, 1965
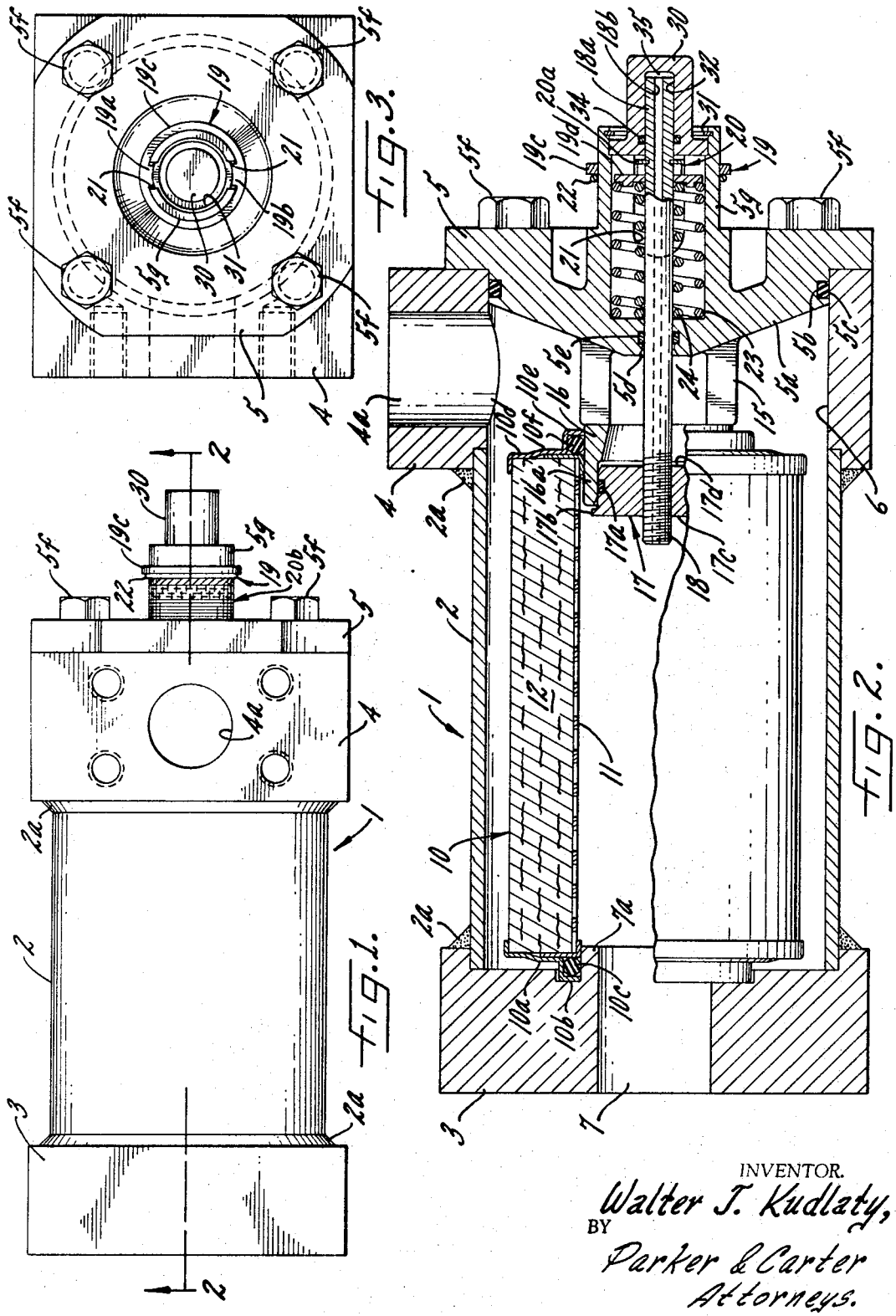
INVENTOR.
Walter J. Kudlaty,
BY
Parker & Carter
Attorneys.

United States Patent Office 3,374,890
Patented Mar. 26, 1968

3,374,890
HYDRAULICALLY BALANCED BY-PASS INDICATOR FOR FILTERS
Walter J. Kudlaty, Elmhurst, Ill., assignor to Marvel Engineering Company, Chicago, Ill., a corporation of Illinois
Filed Feb. 19, 1965, Ser. No. 434,022
9 Claims. (Cl. 210—90)

ABSTRACT OF THE DISCLOSURE

A filter assembly having a housing with an inlet and outlet, a filter element therein with a core directly communicating with the housing outlet, a closure member in said housing having a closed chamber therein, and a sleeve thereon sealingly extending into said core, a by-pass valve seating on said sleeve, an elongated rod extending through said valve into said closed chamber, said rod having an indicator thereon and a passage therein connecting said closed chamber with said core.

---

This invention relates to filters and has particular relation to high pressure fluid filters.

One purpose of the invention is to provide a balanced by-pass valve assembly for filters.

Another purpose is to provide, in combination, a filter, a by-pass valve for said filter, an indicator effective to indicate the condition of said filter and means for hydraulically balancing said by-pass valve.

Another purpose is to provide an indicating filter having a balanced by-pass valve effective to cause fluid to by-pass a filter element and to produce an indication of the condition of said element.

Another purpose is to provide a filter assembly including a by-pass valve and indicator assembly having means for hydraulically balancing said last-named assembly.

Another purpose is to provide an assembly including a filter, a by-pass valve, an indicator operated by said by-pass valve and means for balancing said by-pass valve and indicator.

Another purpose is to provide a hydraulically balanced filter by-pass valve assembly of maximum simplicity and compactness.

Another purpose is to provide an indicating filter assembly of increased accuracy.

Another purpose is to provide a filter and by-pass valve assembly including means for dampening out fluttering under rapid pressure differentials and pressure fluctuations.

Other purposes will appear from time to time during the course of the specification and claims.

The invention is illustrated more or less diagrammatically in the accompanying drawings, wherein:

FIGURE 1 is a top plan view;

FIGURE 2 is a cross-sectional view taken on the line 2—2 of FIGURE 1; and

FIGURE 3 is an end view.

Like parts are indicated by like numerals throughout the specification and drawings.

Referring now to the drawings, the numeral 1 generally designates a filter housing. The filter housing includes a central cylindrical wall 2, a closure body 3 for one open end of said wall, a closure body 4 for the opposite open end of said wall, and an end cap 5 for closing an opening 6 in the body 4. Closure bodies 3 and 4 are secured in a suitable manner to wall 2 as by welds 2a. It will be observed that the opening or bore 6 in the body 4 has an inner diameter corresponding to the inner diameter of the wall 2 and that the bore 6 extends through the body 4, the cap 5 closing one open end of the bore 6, the opposite end of the bore 6 communicating with the area within the cylindrical wall 2.

Closure body 3 includes a central or axial passage or bore 7 having a diameter substantially less than the inner diameter of wall 2. A sleeve portion 7a extends into the area within the wall 2 about the inner open end of the bore 7.

A filter element 10 has a central or axial open core 11 axially aligned with the bore 7 and formed normally of perforated metal. An end plate 10a of filter element 10 includes portions forming an annular recess 10b in which a seal ring 10c is retained for sealing engagement about the outer surface of sleeve 7a. Surrounding the bore 11 is a filter media 12 which may be formed of a variety of materials, examples being wire mesh or paper. A second end plate 10d, corresponding to plate 10a, includes portions forming a recess 10e in which a seal ring 10f is positioned.

The body 4 has an inlet passage 4a communicating with the area within the bore 6 of body 4 and thus with the area within the wall 2 spaced about the filter 10. End cap 5 has a central axial enlargement 5a extending into the bore 6. The enlargement 5a is recessed as indicated at 5b for reception of seal 5c engaging the inner surface of bore 6. A plurality of spaced legs 15 extend from the enlargement 5a through a major portion of the bore 6 and carry a sleeve 16 which further extends into the core 11, the seal 10f engaging the outer surface of sleeve 16.

An open end portion 16a of sleeve 16 receives by-pass valve member 17 and the inner surface of extension 16a engages the seal 17a carried by valve member 17. An annular outwardly extending flange 17b of valve member 17 is engageable with the outer end surface of extension 16a if the valve member 17 should be fully seated on sleeve 16.

A rod 18 is secured to valve member 17 and may, as illustrated, be threadably engaged with valve member 17. The rod 18 extends through sleeve 16 and legs 15 and thence through an axial or central opening 5d in cap 5, a seal 5e being positioned in opening 5d for sealing engagement with the outer surface of rod 18.

The cap 5, which may be conveniently held in body 4 by any convenient means, such as the fasteners 5f, carries a central, rearwardly extending sleeve or housing 5g through which the rod 18 extends. A finger member 19 operatively engages or is connected to rod 18, as indicated at 20, by oppositely directed radial portions 19a and 19b of finger member 19 which extend through slots 21 in the housing 5g and are pinched between a retaining ring 20a and a retainer 19d. Retaining ring 20a engages a slot in rod 18. The finger member 19 has a circular portion 19c which is generally sized to permit movement of the finger member along a portion of the outer circular surface of housing 5g. An indicator ring 22 extends around the outer surface of housing 5g and is positioned abutting the lower surface of finger member 19 as viewed in FIGURES 1 and 2 so that as finger member 19 moves downwardly, it engages the indicator ring and moves such indicator ring downwardly. The outer surface of housing 5g upon which indicator ring 22 moves carries suitable indicia, such as appropriately colored areas or bands as at 20b in FIGURE 1, to enable ready visual ascertainment of movement of indicator ring 22.

Yielding means, such as the springs 23, 24, are positioned in housing 5g and engage a retainer 19d in turn engageable with member 19 to urge the same in a direction outwardly of cap 5 and thereby to urge, through retaining ring 20a and rod 18, the valve member 17 toward a closed position as illustrated in FIGURE 2.

An elongate closure 30 is secured within the outer open end of sleeve housing 5g as by ring 31. Sleeve housing 5g and closure 30 together constitute a subhousing.

The closure 30 has an axial cylindrical or socket portion or chamber 32 into which the end portion 18a of rod 18 extends. A seal 34 is carried by the inner surface of closure 30 for sealing engagement with the outer surface of rod 18. It will be observed that a relatively small chamber portion 35 remains in the base of portion 32 when member 17 is in its closed position as the parts are shown in FIGURE 2. The rod 18 has a continuous axial channel or passage 18b extending throughout its length and comunicating at one end with the area within core 11 and at the opposite end with the chamber area 32, 35 within closure 30.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

While the assembly described and disclosed herein is positionable in a line or conduit carrying fluid to be filtered at various pressures, the invention is particularly useful when employed with systems having fluid pressures of greater amounts, for example those of the order of 500 p.s.i. Fluid enters the inlet 4a, filling the bore 6 and the area within the cylindrical wall 2 about the outer surface of filter element 10. Thence the fluid flows through the filter media 12 and the perforated sleeve defining core 11 from whence the fluid flows outwardly through passage 7 in the closure body 3. Fliud thus entering the core 11 also flows through channel or passage 18b in the rod 18 and into the chamber area 35 within the closure 30. Thus fluid pressure is exerted on the end face 17c of member 17 within core 11 urging it toward its seated position and fluid pressure is also exerted on the opposite end surface of rod 18 urging the rod 18 and member 17 toward open position. The forces of the pressure on valve face 17c and of yielding means 23, 24 are greater than the force exerted on the end surface of rod 18 within member 30 and the valve 17 thus remains in its closed position as illustrated in FIGURE 2. When, however, the filter media 12 shall become clogged so as to restrict the flow of fluid therethrough, increased pressures within the cylinder 2 and bore 6 externally of the filter 10 are exerted against the opposite face 17d of valve member 17 to urge valve 17 outwardly of sleeve extension 16a and thus to open the member 17 against the action of spring 23, 24. Fluid then flows through inlet 4a, bore 6 and sleeve 16 into core 11 from whence the fluid flows outwardly through passage 7 in the body 3, by-passing filter media 12. The balancing of by-pass valve 17 by use of the fluid being filtered insures the opening of the valve at the predetermined desired point and precludes a failure of the valve to open under pressure conditions in which a downstream force exceeds an upstream force. Balancing of valve 17 not only insures opening of the valve but increases the accuracy of the indicator positioned by action of the valve 17 since valve 17 will move in accurate response to the conditions obtaining within housing 1. Since chamber 35 will receive and discharge fluid through passage 18b, it will be realized that a means is thus provided for dampening out the fluttering of valve 17 which could attend the occurrence of rapid pressure differentials and fluctuations in the operation of the assembly and the system in which it is being used. Thus the invention is productive, at relatively minor cost, of numerous desirable objectives in the filter art.

There is claimed:

1. In a fluid filter assembly adapted to direct the fluid to be filtered from an inlet, through a filter chamber containing a filter media, to an outlet and from the inlet, through an unfiltered path, to the outlet when the filter media is cloged, and of the type including, means for housing said filter media, and disc-type valve means adapted for movement to open and close unfiltered communication between said inlet and said outlet in response to the resistance to flow through said filter media, said valve means being adjacent said filter media and including, a valve member having a first face in direct communication with said inlet and a second face exposed to the filtrate, an elongated rod secured to and through said valve member at one end thereof and extending from said first face of said valve member outwardly of said first chamber, and yielding means for urging said valve member to close unfiltered communication between said inlet and said outlet, the improvement comprising:
   a second closed chamber formed by said housing,
   said rod having its other end extending into said second chamber, and
   means in said rod for comunicating the fluid pressure at said second face of said valve member with said second chamber.

2. The improved filter assembly of claim 1 further characterized in that said yielding means includes a spring located externally of said housing and means carried by said rod for engaging said spring whereby said valve is urged to close unfiltered communication between said inlet and said outlet by said rod.

3. The improved filter assembly of claim 1 further characterized by and including means to indicate the position of said valve member.

4. A filter assembly, including, in combination:
   a housing forming a chamber having an inlet and an outlet,
   a filter element having a hollow core positioned in said housing wtih said filter core comunicating with said outlet,
   a closure member for said housing, a closed chamber formed in said closure member,
   a sleeve carried by said closure member and sealingly extending into said filter core,
   a disc-type valve adapted to seat in sealing engagement with said sleeve and having a first side communicating with said inlet and a second side comunicating with said filter core whereby the presure differential across the filter element urges said valve out of sealing engagement with said sleeve,
   an elongated rod carried by said valve and having one end thereof extending from said first side of said valve into said closure member chamber,
   yielding means for urging said valve toward sealing engagement with said sleeve, and
   means for directing the presure at said second side of said valve to said closure member chamber.

5. The filter assembly of claim 4 further characterized in that said pressure directing means includes a passage formed in said rod.

6. The filter assembly of claim 4 further characterized by and including, means for indicating the position of said valve.

7. The filter assembly of claim 4 further characterized in that said yielding means includes a spring located externally of said housing chamber and carried by said closure member.

8. A filter including a housing, a chamber within said housing, an inlet comunicating with said chamber, a filter element in said chamber and having a hollow core, an outlet communicating with said filter core, said inlet being positioned to deliver fluid to said filter element for filtered passage therethrough into said filter core and hence outwardly of said housing through said outlet, a closure member for said housing, a closed chamber within said closure member, a sleeve carried by said closure member and sealingly engaging said filter core, a disc-type valve adapted to seat in sealing engagement with said sleeve and having one side thereof in comunication with said inlet and the other side in comunication with said filter core whereby the pressure differential across the filter element urges said valve out of sealing engagement with the sleeve, said valve when opened being effective to communicate said inlet with said filter core, an elongated rod having a first end secured to said valve and a second end extending outwardly of said housing chamber and into said closure member chamber, yielding means carried by said closure member and operatively engaging said rod to thereby urge said valve toward sealing engagement wtih said sleeve, means for indicating the position of said valve and actuatably by said rod, and means for directing the pressure at said other side of said valve to said closure member chamber.

9. A filter assembly including, in combination,
   a housing,
   a chamber in said housing having an inlet and an outlet,
   a filter element having a hollow core, a first end and a second end, said filter element positioned within said housing chamber with its first end in sealing engagement with said housing and its core in communication with said outlet,
   a closure member for said housing and forming a closed chamber externally of said housing chamber,
   a sleeve carried by said closure member and sealingly extending into said filter core at the second end of said filter element, a disc-type valve member having a first face and a second face and adapted to seat in sealing engagement with said sleeve with said first face of said valve communicating with said inlet and said second face of said valve communicating with said filter core to thereby close unfiltered communication between said inlet and said outlet,
   an elongated rod having a first end and a second end, said first end of said rod secured to said valve member and said second end of said rod extending into said closure member chamber, and
   a passage through said rod effective to communicate the fluid pressure at said second face of said valve member with said closure member chamber.

References Cited

UNITED STATES PATENTS

| | | | |
|---|---|---|---|
| 2,544,269 | 3/1951 | LeClair | 210—133 |
| 2,638,228 | 5/1953 | Downey et al. | 210—133 |
| 2,646,886 | 7/1953 | LeClair | 210—133 |
| 3,080,972 | 3/1963 | Smith | 210—133 X |
| 3,288,289 | 11/1966 | Rosaen | 210—90 |
| 2,348,651 | 5/1944 | Schelly | 210—130 X |
| 2,878,936 | 3/1959 | Scavuzzo et al. | 210—90 |
| 3,150,633 | 9/1964 | Holl | 210—90 X |

FOREIGN PATENTS 1,135,084  12/1956  France.

SAMIH N. ZAHARNA, *Primary Examiner.*

F. SPEAR, *Assistant Examiner.*